(12) United States Patent
Yoon

(10) Patent No.: US 6,574,175 B1
(45) Date of Patent: Jun. 3, 2003

(54) TRACK JUMP CONTROL DEVICE FOR OPTICAL DISC DRIVE AND METHOD THEREOF

(75) Inventor: Hyeong-deok Yoon, Yongin (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 106 days.

(21) Appl. No.: 09/617,782

(22) Filed: Jul. 17, 2000

(30) Foreign Application Priority Data

Aug. 28, 1999 (KR) .............................. 99-36114

(51) Int. Cl.[7] ................................ G11B 7/00
(52) U.S. Cl. .................. 369/44.28; 369/44.29
(58) Field of Search ................. 369/44.29, 44.35, 369/44.25, 44.26, 44.34, 44.28; 360/78.05

(56) References Cited

U.S. PATENT DOCUMENTS

| | | | | |
|---|---|---|---|---|
| 4,858,214 A | * | 8/1989 | Baba ................ | 369/44.28 |
| 4,866,687 A | * | 9/1989 | Kasai et al. ........ | 360/78.05 |
| 5,050,146 A | * | 9/1991 | Richgels et al. ..... | 369/44.28 |
| 5,416,758 A | * | 5/1995 | Ito ................. | 369/44.28 |
| 6,192,009 B1 | * | 2/2001 | Kim ................ | 369/44.34 |

FOREIGN PATENT DOCUMENTS

| | | |
|---|---|---|
| JP | 61-203424 | 12/1986 |
| JP | 64-66829 | 3/1989 |
| JP | 8-147907 | 6/1996 |

\* cited by examiner

Primary Examiner—Thang V. Tran
(74) Attorney, Agent, or Firm—Sughrue Mion, PLLC

(57) ABSTRACT

There is provided a track jump control device and method for an optical disc drive. A track jump control device of the present invention for jumping an optical spot from one track to another track in an optical disc drive, comprising an optical spot position command generator for generating predetermined optical spot position command data to designate the position of an optical spot every predetermined sampling period by commencing operation in response to a track jump command provided from an external source and for generating switching control polarity data for switching control, an adder for subtracting tracking error data from the optical spot position command data; and a switching unit for generating the optical spot position command data with a polarity which is left intact or reversed in response to the switching control polarity data. The track jump control device of the present invention performs stable jumps in the presence of exterior mechanical effects such as disc eccentricity, in a case in which a small number of tracks are jumped in an optical disc drive such as a DVD-RAM drive.

10 Claims, 3 Drawing Sheets

TRACK JUMP CONTROL DEVICE FOR OPTICAL DISC DRIVE AND METHOD THEREOF

BACKGROUND OF THE INVENTION

1. Field of the Invention

The present invention relates to a method of track jumping in an optical disc drive, and more particularly, to a track jumping method for performing stable jumps against exterior effects such as disc eccentricity at the time of jumping a small number of tracks in an optical disc drive.

2. Description of the Related Art

The bang-bang control method is known as a typical track jump control method. It has such advantages in that it is simple and readily realized even under non-linear characteristic of an optical disc drive position sensor. However, as optical disc drives have been developed to have high speed and high density, a need exists for a track jump control device for performing more stable and high speed track jumps.

FIG. 1 is a block diagram illustrating a conventional track jump control device. Referring to FIG. 1, a switch (SW) of a conventional track jump control device is switched to operate in either a track follow mode or a track jump mode according to a switching command signal to drive the switch (SW) as shown in FIG. 2A (a). In other words, the track follow mode becomes an operation mode when the switch (SW) is switched to $S_1$, and the track jump mode becomes an operation mode when the switch (SW) is switched to $S_2$ in response to a track jump command provided from an external source. In a track jump mode, a power driver generates a drive signal ($t_{rd}$) which is output to a pickup actuator. As the pickup actuator operates according to the drive signal ($t_{rd}$), an optical spot jumps from one track to the next. Thus, a relative position ($y_1$) of the optical spot with respect to disc tracks varies as shown in FIG. 2A (b). In this case, a tracking error sensor generates a tracking error ($y_2$) as shown in FIG. 2A (c). In FIG. 2A (d) an example of the pickup drive signal ($t_{rd}$), which is provided to the pickup actuator in response to the track jump command, is shown. In FIG. 2B disc eccentricity and an example of the pickup drive signal at the time of a track jump are shown.

Considering only a standard eccentricity frequency, the following relationship exists between eccentricity ($x_{ecc}$) and eccentricity velocity ($V_{ecc}$).

$$x_{ecc} = A \sin(t) \quad (1)$$

$$V_{ecc} = A \cos(t) \quad (2)$$

The time at which a jump is commenced is determined independently of the eccentricity. Thus, the tracking error needs to be controlled to fall within half the width of a track at the end of a bang-bang operation. In addition, in order to perform stable pull-in operation, a track over-run at the moment of the pull-in in a bang-bang jump needs to be reduced as much as possible.

However, according to the above method, the pull-in operation may be unstable due to an increase in the tracking error at the end of the bang-bang jump when a large eccentricity is generated or a large exterior effect is provided.

Also, according to the above method, when the eccentricity velocity increases in a high speed spindle drive, it is necessary to control such that a step jump is completed within a short time period by reducing the width of a bang-bang pulse. However, there is a problem such that a track over-run may readily occur when the tracking error at the time of the pull-in has a large initial value.

SUMMARY OF THE INVENTION

To solve the above problems, it is an objective of the present invention to provide a track jump control device which makes it possible to perform a high speed jump and to reduce overshoot at the time of the pull-in for the case of a disc drive with a large eccentricity.

It is another objective of the present invention to provide a track jump control method applicable to the above device.

Accordingly, to achieve the first objective, there is provided a track jump control device for jumping an optical spot from one track to another track in an optical disc drive, comprising an optical spot position command generator for generating predetermined optical spot position command data to designate the position of an optical spot every predetermined sampling period by commencing operation in response to a track jump command provided from an external source and for generating switching control polarity data for switching control, an adder for subtracting tracking error data from the optical spot position command data, and a switching unit for generating the optical spot position command data with a polarity which is left intact or reversed in response to the switching control polarity data.

Also, the track jump control device further includes a linearization unit for generating linearized tracking error data by performing linearization with respect to a tracking error value generated in and output from a tracking error sensor, wherein the adder preferably subtracts the linearized tracking error data from the optical spot position command data.

The switching unit preferably includes a first amplifier for outputting the optical spot position command data with a first polarity, a second amplifier for outputting the optical spot position command data to a second polarity having a polarity opposite to the first polarity, and a switch for being switched to an output of the first amplifier in response to polarity data with a first logic level and for being switched to an output of the second amplifier in response to polarity data with a second logic level opposite to the first logic level.

The predetermined optical spot position command data preferably is cut at a time sufficiently prior to the commencement of the pull-in, at a portion at which the tracking error exceeds a predetermined level.

To achieve the second objective, there is provided a track jump control method for jumping an optical spot from one track to another track in an optical disc drive, comprising the steps of (a) generating predetermined optical spot position command data to designate the position of an optical spot every predetermined sampling period by commencing operation in response to a track jump command provided from an external source, and generating switching control polarity data for switching control, (b) subtracting tracking error data from the optical spot position command data, and (c) outputting the optical spot position command data with a polarity which is left intact or reversed in response to the switching control polarity data.

BRIEF DESCRIPTION OF THE DRAWINGS

The above objectives and advantages of the present invention will become more apparent by describing in detail a preferred embodiment thereof with reference to the attached drawings in which.

DESCRIPTION OF THE PREFERRED EMBODIMENTS

Figure 1:
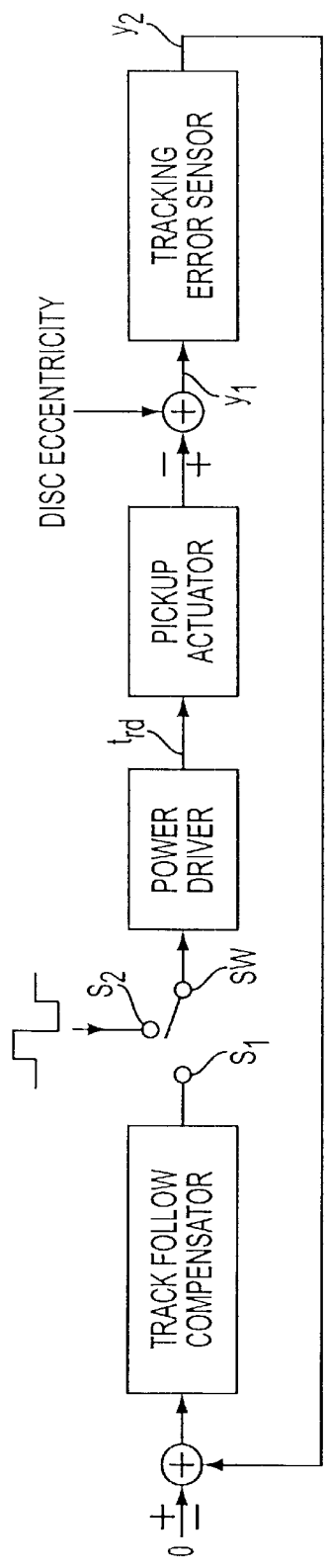
FIG. 1 is a block diagram illustrating a conventional track jump control device.
Figure 3:
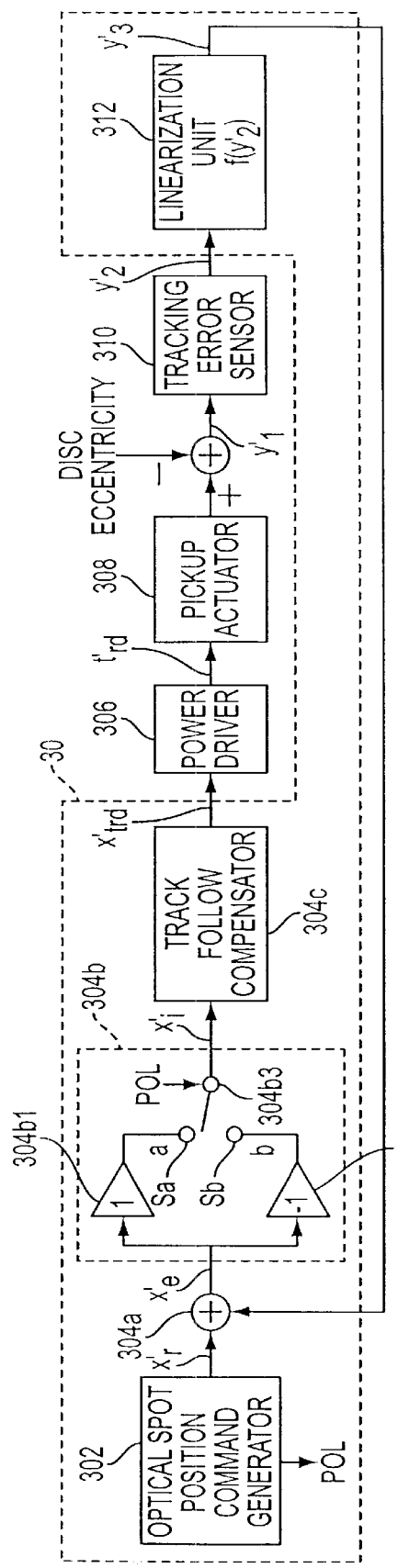
FIG. 3 is a block diagram illustrating the structure of a track jump device according to the present invention.
Figure 2A:
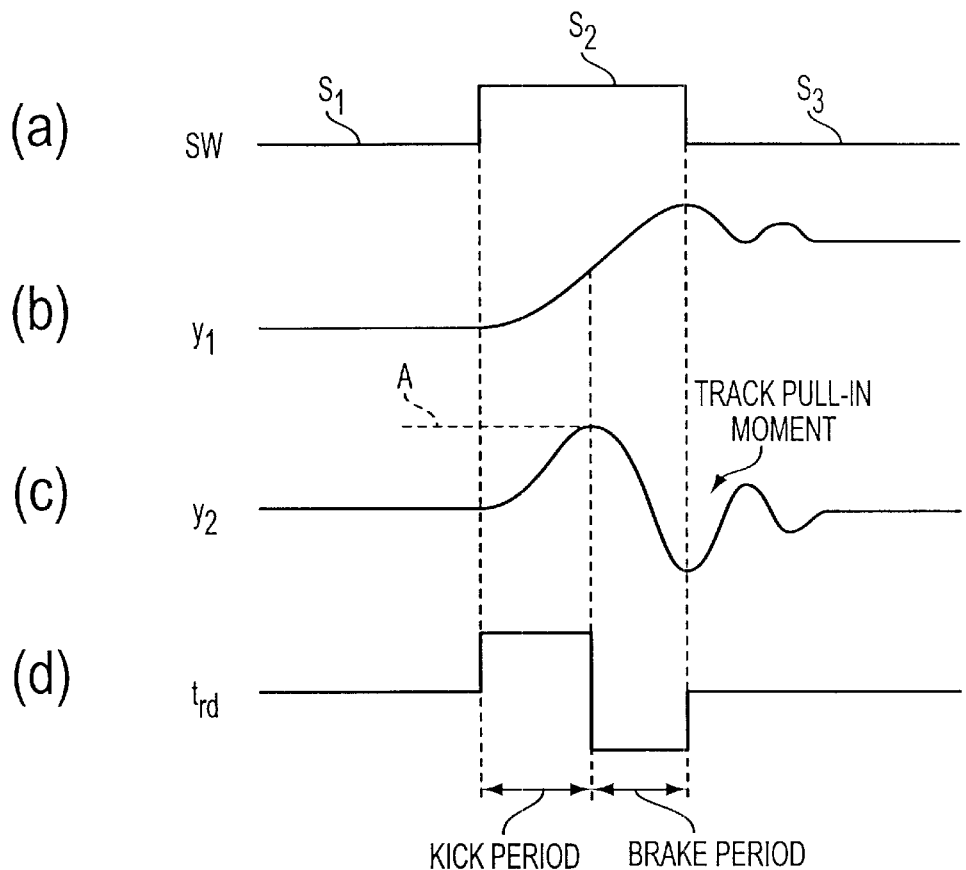
FIG. 2A is a waveform diagram for a description of the operation of the device in FIG. 1.
Figure 2B:
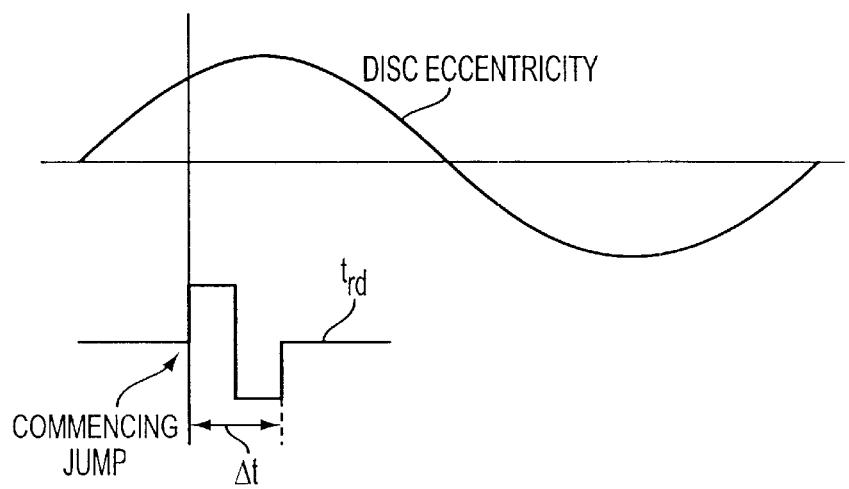
FIG. 2B is a waveform diagram for a description of the relationship between disc eccentricity and an actuator drive signal of the device in FIG. 1.

FIG. 3 is a block diagram illustrating a preferred embodiment of a track jump device according to the present invention. Referring to FIG. 3, a track jump device of the present invention includes an optical spot position command generator 302, an adder 304a, a switching unit 304b, a track follow compensator 304c, a power driver 306, a pickup actuator 308, a tracking error sensor 310, and a linearization unit 312. The switching unit 304b includes a first amplifier 304b1, a second amplifier 304b2, and a switch 304b3. In this embodiment, the optical spot position command generator 302, the adder 304a, the switching unit 304b, the track follow compensator 304c, and the linearization unit 312 are included in a digital signal processor (DSP) 30.

Figure 4:
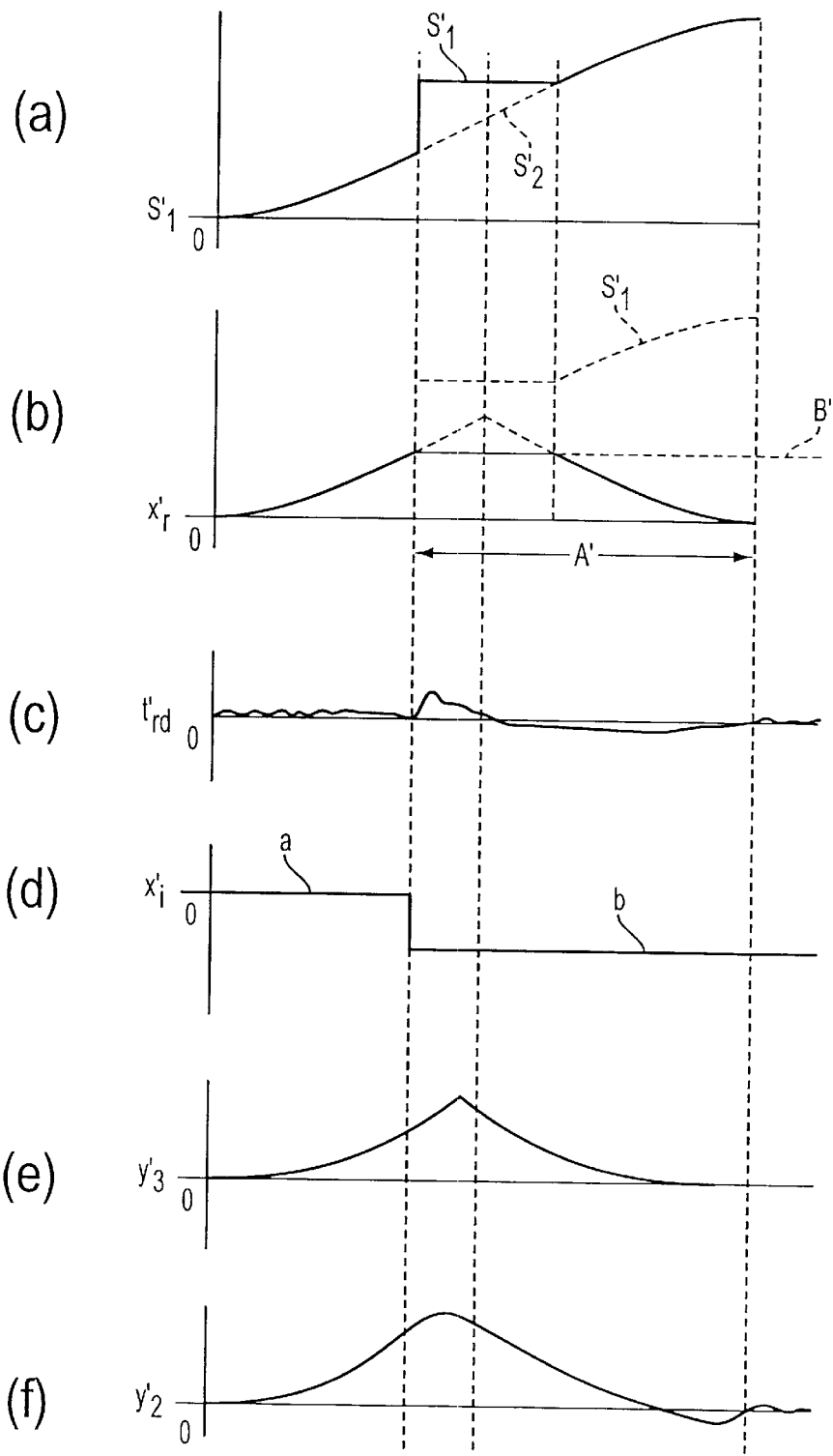
FIG. 4 is a waveform diagram for describing the operation of the device in FIG. 3.

A detailed description of operation of the device in FIG. 3 follows. The optical spot position command generator 302 reads from a memory table (not shown) optical spot position command data $x'_r$ as shown in FIG. 4(b) and, for every point in the timing of the optical spot, generates corresponding optical spot command data $x'_r$. The optical spot position command data $x'_r$ designates the positions of optical spots.

A tracking error at the time of track jump typically has the form of a sine function. In other words, the tracking error is zero (0) when an optical spot is located in the center of a track, and the tracking error increases in the form of a sine function as the optical spot moves from one track to another track. The tracking error has a maximum value when the optical spot is located in the middle of two tracks, i.e., when the optical spot is located between one track and another track to which a jump is performed. A track pull-in is then performed after departing from the middle of two tracks. However, when the tracking error has a large value at the time of the track pull-in, it may be difficult to properly perform tracking because of the large value of the tracking error. Thus, in order to perform a stable track pull-in, it is necessary to reduce the tracking error at the time of the track pull-in.

In the embodiment according to the present invention, the optical spot position command generator 302, referring to a memory table storing a modified position profile as shown in FIG. 4(a), generates the optical spot position command data $x'_r$ as shown in FIG. 4(b) and a switching command signal (POL) in response to a track jump command (not shown) provided from an external source. An optical spot position profile before modification is represented as $S'_2$, and a modified optical spot position profile is represented as $S'_1$. In the optical spot position command data $x'_r$ according to the modified optical spot position profile (FIG. 4(a)), a portion of the data exceeding a predetermined level B' is cut, as shown in FIG. 4(b), before a point corresponding to the middle of two tracks and is symmetrical with respect to the middle of two tracks. A portion after the cut in accordance with the level B' is represented as A'. Thus, the optical spot position command data $x'_r$ according to the modified optical spot position profile $S'_1$ is cut, at a time sufficiently prior to the commencement of the pull-in, at the portion A', at which the tracking error exceeds the predetermined level (B').

Next, the adder 304a generates modified error data $x'_e$ by subtracting linearized tracking error data $y'_3$ obtained from the linearization unit 312 from the optical spot position command data $x'_r$. The modified error data $x'_e$ is provided to the first and second amplifiers 304b1 and 304b2.

The switch 304b3 performs switching operations as shown in FIG. 4(d) in accordance with switching control polarity data (POL). The switch 304b3 is switched to either an output (Sa) of the first amplifier 304b1 or an output (Sb) of the second amplifier 304b2 in response to the switching control polarity data (POL). For example, when the switch 304b3 is switched to position a or position b, the track follow compensator 304c receives track follow input data corresponding to $x'_i = x'_e$ or $x'_i = -x'_e$. Thus, at the portion A' exceeding the predetermined level B', the optical spot position command data $x'_r$ is transferred with a polarity which is left intact or reversed according to the switching control polarity data (POL).

The track follow compensator 304c performs digital filtering with respect to track follow input data $x'_i$ to generate compensated track follow data $x'_{trd}$. The power driver 306 receives the compensated track follow data $x'_{trd}$ and generates a driving signal $t'_{rd}$ as shown in FIG. 4(c) to drive the pickup actuator 308. The driving signal $t'_{rd}$ is analog and drives the pickup actuator 308. The tracking error sensor 310 receives a signal $y'_1$ which has been affected by exterior mechanical conditions such as disc eccentricity. The tracking error sensor 310 detects a tracking error to generate a tracking error value ($y'_2$) as shown in FIG. 4(f).

The linearization unit 312 performs linearization with respect to the tracking error value $y'_2$ to generate the linearized tracking error data $y'_3$ as shown in FIG. 4(e). The linearized tracking error data $y'_3$ is input to the adder 304a and subtracted from the optical spot position command data $x'_r$.

The track jump control device described above operates in a track follow mode through the entire period of a jump at the time of jumping a track. Thus, if a mechanical exterior effect such as disc eccentricity is properly followed, a stable jump may be performed independently of the time at which the jump is commenced. Also, in the case that the mechanical exterior effect is large, for example, a disc with large eccentricity is driven, the track jump control device can still reduce overshoot at the time of a track pull-in. Especially, the present invention may be effectively utilized in a DVD-RAM drive having a high variation rate of disc eccentricity with respect to a variation rate of the optical spot position command signal.

For reference, a digital signal processor of the track jump control device may perform, every sampling period, the following process routines using a software program.

Read $y'_2$ from Analog to Digital Converter (ADC)
    Calculate $y'_3$
    Get $x'_r$ from memory table
    Calculate $x'_e = x'_r - y'_3$
    Get SW data from memory table
    Calculate $x'_i = x'_e$ (if SW=a)
        $x'_i = -x'_e$ (if SW=b)
    Calculate $x'_{trd} = x'_e$: output signal of a digital track follow compensator
    Input cut $x'_{trd}$ to Digital to Analog Converter (DAC)

Therefore, the track jump control method according to the present invention performs stable jumping in the presence of mechanical exterior effect such as disc eccentricity at the time of jumping a small number of tracks in an optical disc drive such as a DVD-RAM drive.

Although the above embodiments have been described with respect to the case of jumping a track, the present invention may be utilized not only in a DVD-RAM drive for one track jump operation but also in an optical disc drive for a close range jump method where a position command generator is expanded such that the optical spot position command generator generates a position command to jump multiple tracks. Thus, it will be understood that the above embodiments may be changed or modified by those skilled in the art without departing from the spirit and scope of the invention. It will also be understood that the disclosed preferred embodiments do not confine the scope of the invention. Rather the scope of the invention is defined by the appended claims.

What is claimed is:

1. A track jump control device for jumping an optical spot from one track to another track in an optical disc drive, comprising:
    an optical spot position command generator for generating predetermined optical spot position command data to designate the position of an optical spot by commencing operation in response to a track jump command provided from an external source, and for generating switching control polarity data for switching control;
    an adder coupled to the optical spot position command generator for subtracting linearized tracking error data from the optical spot position command data; and
    a switching unit coupled to the adder for outputting error data from the adder with a polarity that is left intact or reversed in response to the switching control polarity data, wherein the optical spot position command generator, in response to the optical spot position command data being at a predetermined threshold level, generates the switching control polarity data to control the switching so that the polarity is reversed.

2. The track jump control device of claim 1, further including a linearization unit coupled to the adder for generating linearized tracking error data by performing linearization with respect to a tracking error value generated by and output from a tracking error sensor,
    wherein the adder subtracts the linearized tracking error data from the optical spot position command data.

3. The track jump control device of claim 1, wherein the switching unit includes:
    a first amplifier for outputting the error data with a first polarity;
    a second amplifier for outputting the error data with a second polarity having a polarity opposite to the first polarity; and
    a switch connected to outputs of the first and second amplifiers for switching to an output of the first amplifier in response to the polarity data having a first logic level and for switching to an output of the second amplifier in response to the polarity data having a second logic level opposite to the first logic level.

4. The track jump control device of claim 1, wherein the predetermined optical spot position command data is cut at a time sufficiently prior to commencement of a pull-in, at a portion at which the tracking error exceeds a predetermined level.

5. The track jump control device of claim 1, wherein the optical spot position command generator generates the predetermined optical spot command data to designate the position of the optical spot every predetermined sampling period.

6. A track jump control method for jumping an optical spot from one track to another track in an optical disc drive, comprising:
    (a) generating predetermined optical spot position command data to designate the position of an optical spot by commencing operation in response to a track jump command provided from an external source, and generating switching control polarity data for switching control;
    (b) subtracting linearized tracking error data from the optical spot position command data to generate error data; and
    (c) outputting the error data from step (b) with a polarity that is left intact or reversed in response to the switching control polarity data, wherein the switching control polarity data is reversed in response to the optical spot position command data being at a predetermined threshold level.

7. The track jump control method of claim 6, further comprising generating linearized tracking error data by performing a linearization with respect to a tracking error value generated by and output from a tracking error sensor,
    wherein, in (b) the linearized tracking error data is subtracted from the optical spot position command data.

8. The track jump control method of claim 6, wherein (c) includes:
    (c-1) outputting the error data with a first polarity;
    (c-2) outputting the error data with a second polarity having a polarity opposite to the first polarity; and
    (c-3) selectively performing one of (c-1) and (c-2) in response to a logic level of the switching control polarity data.

9. The track jump control method of claim 6, wherein the predetermined optical spot position command data is cut at a time sufficiently prior to commencement of a pull-in, at a portion at which the tracking error exceeds a predetermined level.

10. The track jump control method of claim 6, wherein the predetermined optical spot position command data is generated every predetermined sampling period.

* * * * *